(12) United States Patent
Jeong

(10) Patent No.: US 9,432,507 B2
(45) Date of Patent: Aug. 30, 2016

(54) SYSTEM AND METHOD FOR PROVIDING INFORMATION OF OUTGOING CALL

(71) Applicant: NAVER CORPORATION, Seongnam-si, Gyeonggi-do (KR)

(72) Inventor: Hyeon Su Jeong, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 0 days.

(21) Appl. No.: 14/645,754

(22) Filed: Mar. 12, 2015

(65) Prior Publication Data

US 2015/0296081 A1    Oct. 15, 2015

(30) Foreign Application Priority Data

Apr. 11, 2014    (KR) .......................... 10-2014-0043684

(51) Int. Cl.
```
H04M 1/56       (2006.01)
H04M 15/06      (2006.01)
H04M 3/436      (2006.01)
```
(52) U.S. Cl.
CPC ................................. H04M 3/4365 (2013.01)

(58) Field of Classification Search
CPC ... B29C 66/1122; B29C 66/71; B29C 65/00; B60R 21/23138; B29K 2077/00
USPC ............ 379/142.01, 142.06, 142.09, 142.17, 379/242, 245, 247, 142.04; 370/352–356; 709/204, 205
See application file for complete search history.

(56) References Cited

U.S. PATENT DOCUMENTS 9,118,760 B2 *   8/2015   Atef ........................ H04L 67/34
2008/0130843 A1   6/2008   Ueshima
2010/0002685 A1 *   1/2010   Shaham ................ H04M 3/002
                                                           370/352
2013/0094639 A1   4/2013   Kim
2013/0279670 A1 *   10/2013   Wisman ............. H04M 7/0027
                                                           379/93.17

FOREIGN PATENT DOCUMENTS

JP    2004-320544 A    11/2004
JP    4077866 B2    4/2008
JP    2008-193343 A    8/2008

(Continued)

OTHER PUBLICATIONS

Apr. 23, 2015 Korean Office Action issued in corresponding Korean Application No. 10-2014-0043684.

(Continued)

*Primary Examiner* — Binh Tieu
(74) *Attorney, Agent, or Firm* — Harness, Dickey & Pierce, P.L.C.

(57) ABSTRACT

An outgoing call information providing device includes a non-transitory computer-readable medium configured to store program code and a processor configured to execute the program code to receive a call connection request signal from a caller party terminal, the call connection request includes (i) a phone number of a called party terminal and (ii) a source code indicating a source from which the caller party terminal obtained the phone number of the called party terminal; extract the source code from the call connection request signal; parse the extracted source code; generate outgoing call channel information based on the parsed source code, the outgoing call channel information indicating the source; and transmit the call connection request signal according to the phone number of the called party terminal such that the called party terminal receives the generated outgoing call channel information with a phone number of the caller party terminal.

20 Claims, 11 Drawing Sheets

(56) References Cited

FOREIGN PATENT DOCUMENTS

| | | |
|---|---|---|
| JP | 2013-090327 A | 5/2013 |
| KR | 10-2013-0049237 | 5/2013 |

OTHER PUBLICATIONS

Japanese Office Action to corresponding Japanese Application No. 2015-018132 mailed on Mar. 1, 2016.

* cited by examiner

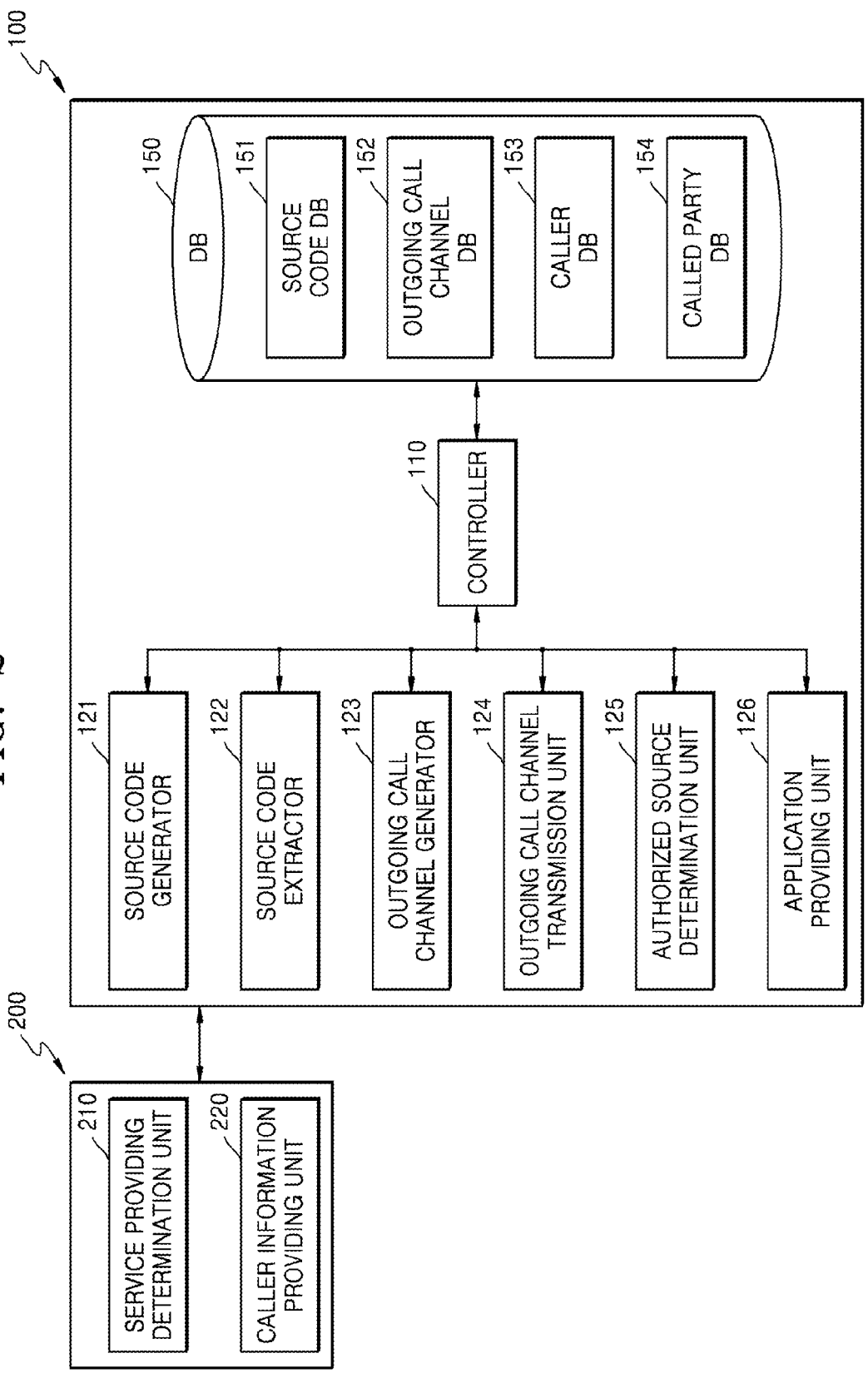

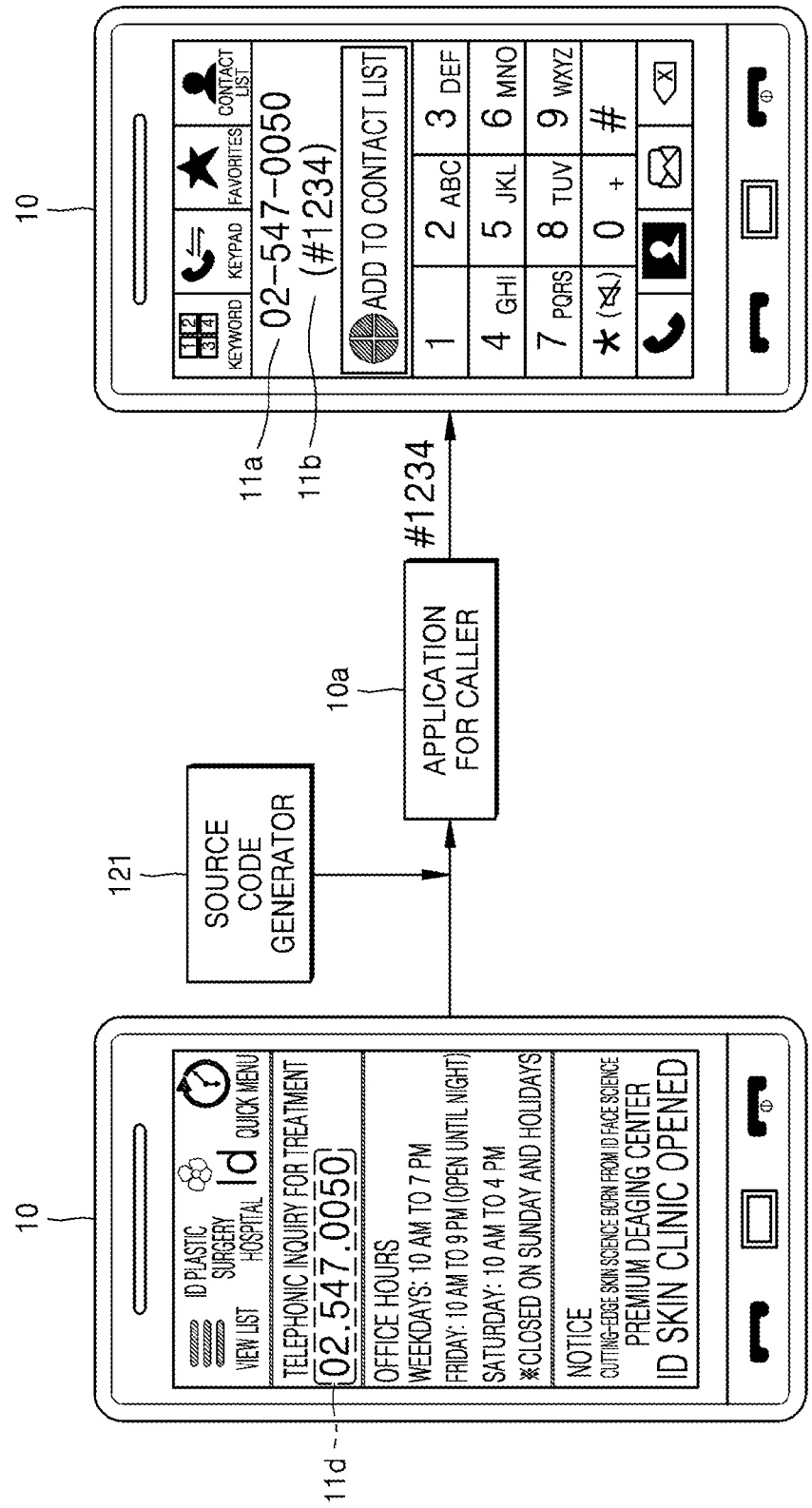

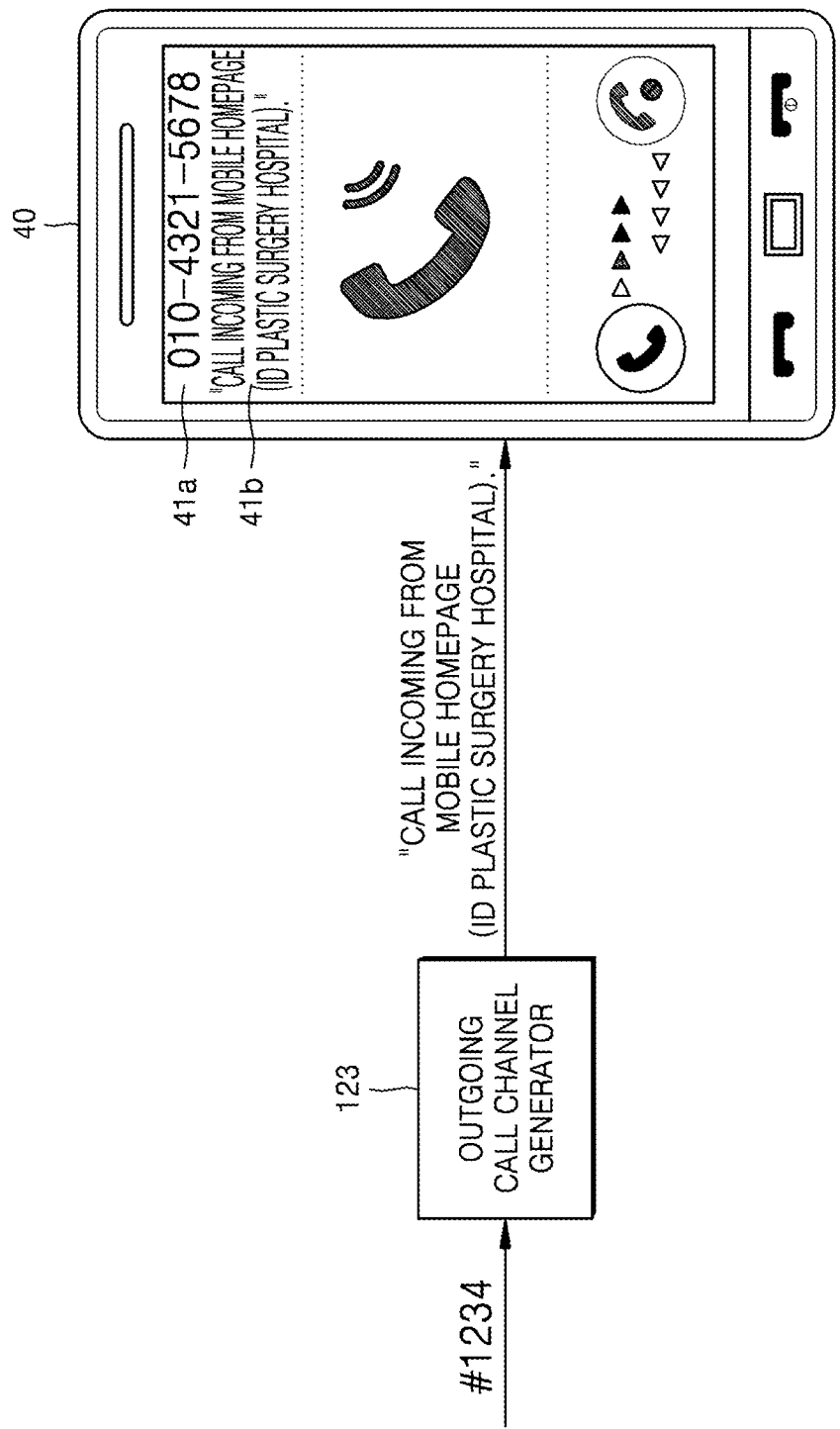

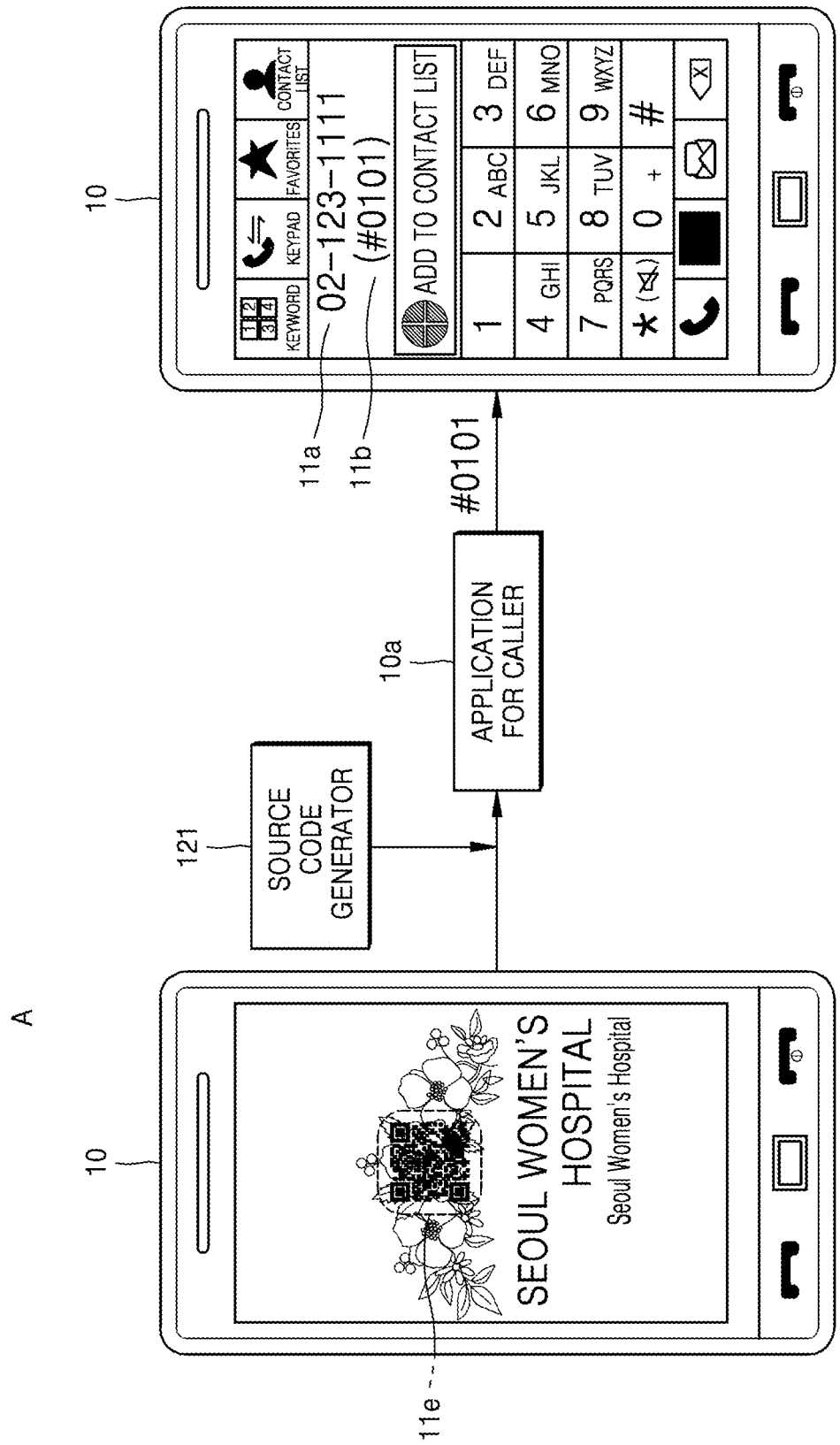

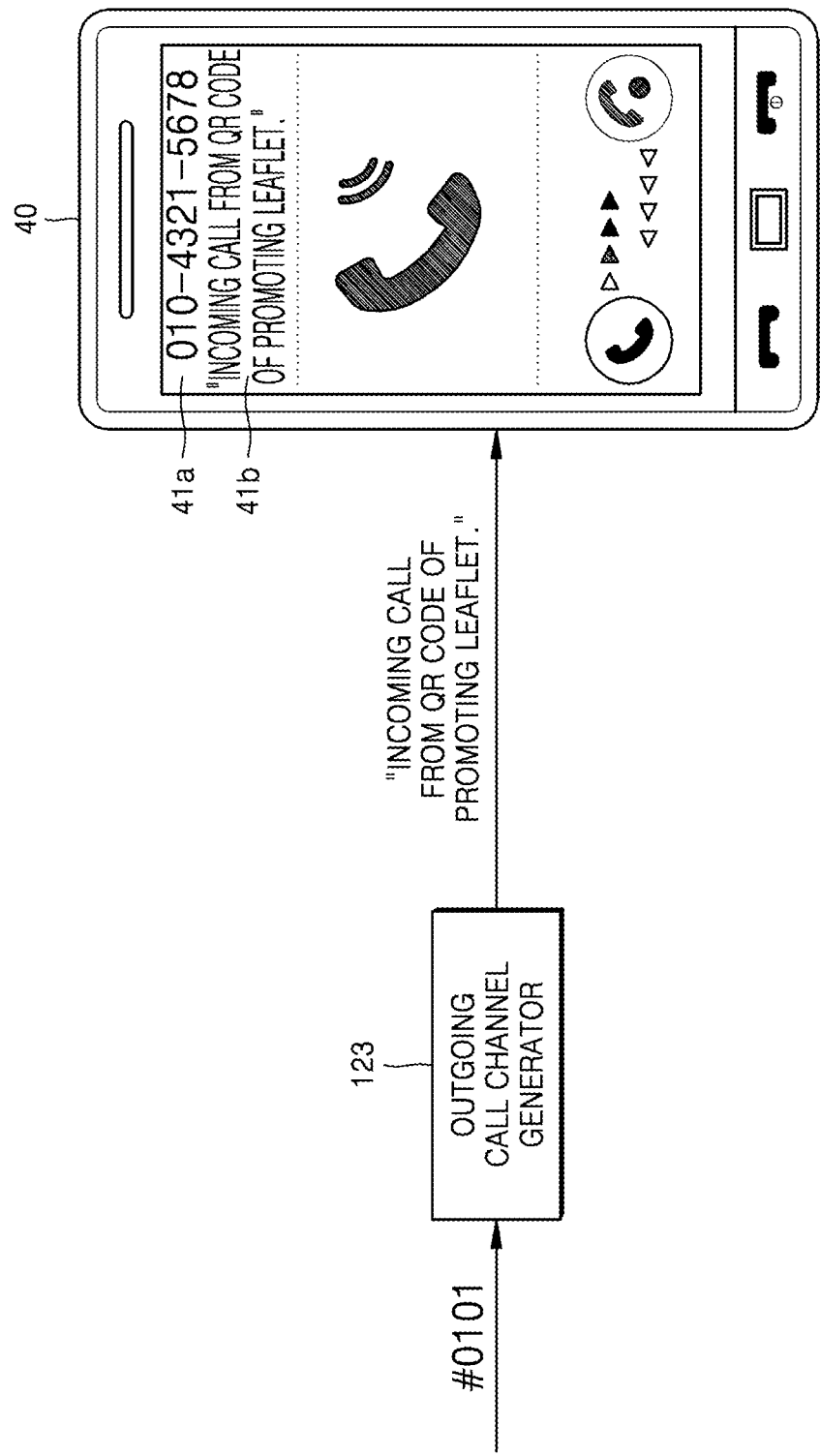

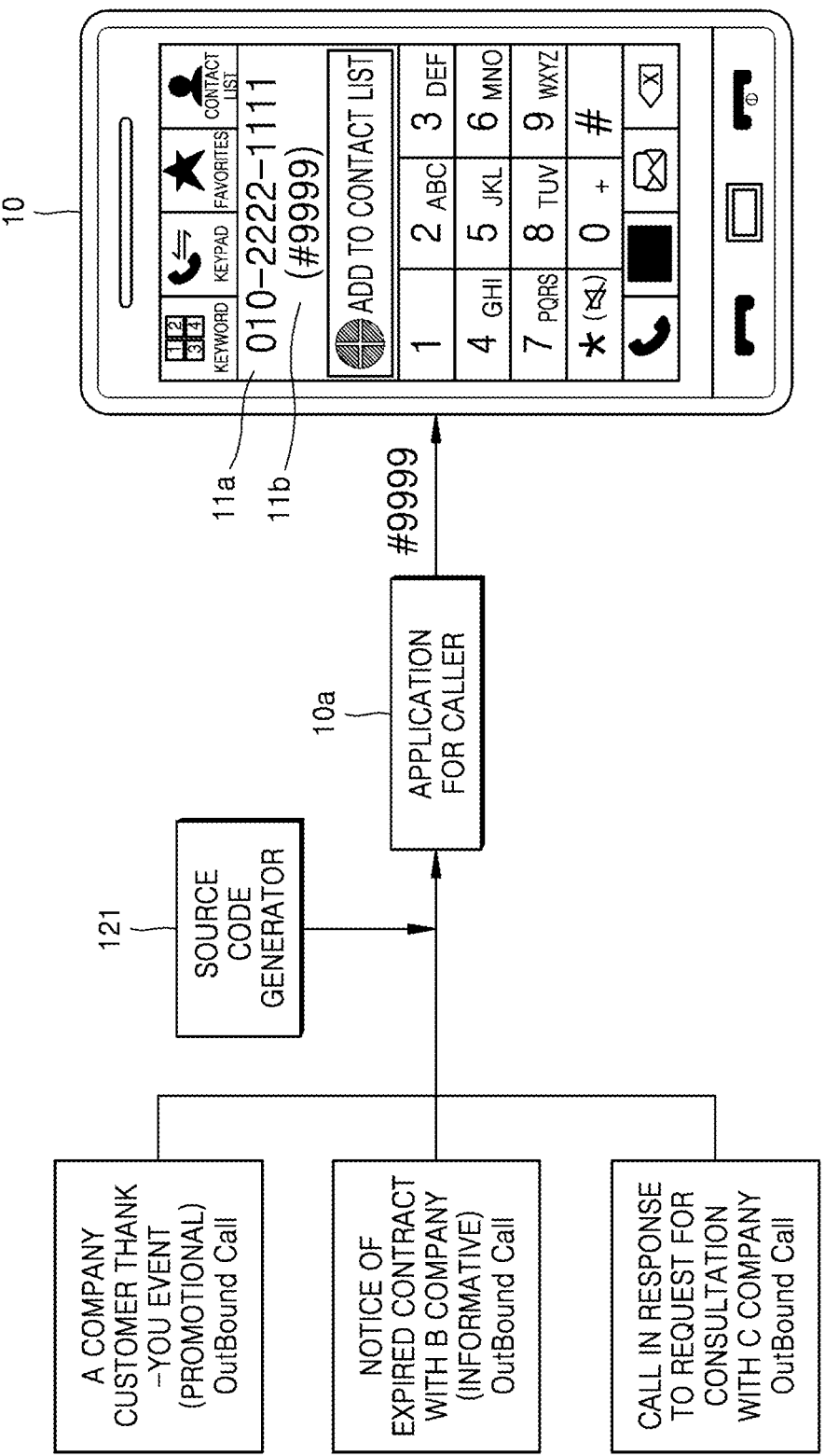

SYSTEM AND METHOD FOR PROVIDING INFORMATION OF OUTGOING CALL

RELATED APPLICATIONS

This application claims the benefit of Korean Patent Application No. 10-2014-0043684, filed on Apr. 11, 2014, in the Korean Intellectual Property Office, the disclosure of which is incorporated herein in its entirety by reference.

BACKGROUND

1. Field

One or more example embodiments relate to a method and system for providing information of an outgoing call, and more particularly, to a method and system for providing information of an outgoing call, which are capable of providing a called party with meaningful information regarding a caller by providing information regarding a channel through which the caller obtained the phone number of the called party.

2. Description of the Related Art

As a market for mobile communication devices grows in size, mobile communication has becomes a more essential part of modern life. However, a problem that has risen as the mobile devices more prevalent is that personal information leakage, and an increase in a number of spam calls received by mobile device users due to the personal information leakage, has increased. In particular, spam calls are considered to be worse in terms of annoyance than spam text messages or spam email, since spam calls should be rapidly responded thereto. Thus, some mobile device users have used a caller identification service to refuse to answer calls from calling parties who are not registered to a contact list stored in their mobile devices. However, the blocking of all calls from non-registered calling parties may result in both promotional calls (i.e., spam calls) and desired calls or other like calls being blocked.

Furthermore, as technology has advanced, advertisers have been offered a wide choice of advertisement media. As a representative example, offline advertisements such as newspaper advertisements and television (TV) advertisements occupied a large part of advertisement in the past. However, online advertisements are increasingly occupying a larger share of the adverting market. Furthermore, the number of advertising media has increased in relation to the prevalence of mobile devices. Since the advertising effect of an online advertisement may vary according to the advertising media to which it is applied (e.g., a homepage, a search advertisement, a café, a blog, a content advertisement, and the like), many advertisers have to carefully choose an advertisement medium from among a plurality of advertising media to promote their goods and/or services. However, advertisers who promote their products and/or services online are not able to determine an advertising medium through which consumers contact them, and thus, many advertisers have difficulties evaluating the efficiencies and/or effectiveness of a particular advertisement media.

SUMMARY

At least one example embodiment relates to a device for providing outgoing call information.

According to an example embodiment, an outgoing call information providing device includes a non-transitory computer-readable medium configured to store program code and a processor configured to execute the program code to receive a call connection request signal from a caller party terminal, the call connection request includes (i) a phone number of a called party terminal and (ii) a source code indicating a source from which the caller party terminal obtained the phone number of the called party terminal; extract the source code from the call connection request signal; parse the extracted source code; generate outgoing call channel information based on the parsed source code, the outgoing call channel information indicating the source; and transmit the call connection request signal according to the phone number of the called party terminal such that the called party terminal receives the generated outgoing call channel information with a phone number of the caller party terminal.

At least one example embodiment provides that the processor executes the program code to generate the source code when the phone number of the called party terminal is obtained by the caller party terminal, and provide the source code to the caller party terminal when a calling function is activated by the caller party terminal, the calling function being activated when the phone number of the called party terminal is obtained by the caller party terminal, the calling function being used to generate the call connection request.

At least one example embodiment provides that the processor executes the program code to determine whether the extracted source code is an authorized source code after the call connection request is received by determining whether source code previously allocated to the caller terminal is substantially similar to the source code in the call connection request signal.

At least one example embodiment provides that the outgoing call channel information includes information indicating the source from which the caller party terminal obtained the phone number of the called party terminal, the phone number of the called party terminal being a target of the call connection request signal transmitted from the caller party terminal.

At least one example embodiment provides that the outgoing call channel information indicates that the call connection request signal is generated by at least one of (i) dialing the phone number of the called party terminal, (ii) selecting the phone number of the called party from a contact list of the caller party terminal, (iii) obtaining the phone number of the called party terminal is via a link from a webpage, (iv) obtaining the phone number of the called party from an advertising medium, (v) obtaining the phone number of the called party from a database, (vi) and obtaining the phone number of the called party being via a scan of a quick response (QR) code.

At least one example embodiment provides that the processor executes the program code to generate a caller party application to be provided to the caller party terminal, the caller party application inserting the generated outgoing call channel information into the call connection request signal, and generate a called party application to be provided to the called terminal, the called party application transforming the outgoing call channel information into display data, the display data being displayed by the called party terminal when the called party receives the call connection request signal.

At least one example embodiment provides that the caller party application detects the outgoing call channel, matches the outgoing call channel with the source code when a calling function is activated in the caller party terminal, and inserts the matching source code into the call connection request signal when the call connection request signal is generated.

At least one example embodiment provides that the display data includes at least one of text data, audio data, image data, and video data.

At least one example embodiment provides that the processor executes the program code to provide the caller party application to the caller party terminal, and provide the called party application to the called party terminal.

At least one example embodiment provides that the display data is one of (i) provided to the outgoing call information providing device by the caller party terminal and (ii) extracted from a webpage associated with the caller party terminal.

At least one example embodiment relates to a method of providing outgoing call channel information.

According to at least one example embodiments, a method of providing outgoing call channel information includes receiving, by a processor, a call connection request signal from a caller party terminal, the call connection request including (i) a phone number of a called party terminal and (ii) a source code indicating a source from which the caller party terminal obtained the phone number of the called party terminal; extracting, by the processor, the source code from the call connection request signal; generating, by the processor, outgoing call channel information by parsing the source code, the outgoing call channel information being based on at least one portion of the parsed source code, the outgoing call channel information indicating the source; and transmitting, by the processor, the call connection request signal according to the phone number of the called party terminal such that the called party terminal receives the generated outgoing call channel information with a phone number of the caller party terminal.

At least one example embodiment provides that the source code is generated when the phone number of the called party terminal is obtained by the caller party terminal, and the generated source code is provided to the caller party terminal when a calling function is activated by the caller party terminal, the calling function being activated when the phone number of the called party terminal is obtained by the caller party terminal, the calling function being used to generate the call connection request.

At least one example embodiment provides that the method further includes determining whether the extracted source code is an authorized source code, after the call connection request is received, by determining whether source code previously allocated to the caller terminal is substantially similar to the source code in the call connection request signal.

At least one example embodiment provides that the outgoing call channel information includes information indicating the source from which the caller party terminal obtained the phone number of the called party terminal, the phone number of the called party terminal being a target of the call connection request signal transmitted from the caller party terminal.

At least one example embodiment provides that the outgoing call channel information indicates that the call connection request signal is generated by at least one of (i) dialing the phone number of the called party terminal, (ii) selecting the phone number of the called party being from a contact list of the caller party terminal, (iii) obtaining the phone number of the called party terminal via a link of a webpage, (iv) obtaining the phone number of the called party terminal from an advertising medium, (v) obtaining the phone number of the called party terminal from a database, (vi) and obtaining the phone number of the called party via a scan of a quick response (QR) code.

At least one example embodiment provides that displaying the outgoing call channel information on a screen of the called party terminal.

At least one example embodiment provides relates to a method of providing outgoing call channel information.

According to at least one example embodiment, a method of providing outgoing call channel information includes receiving, by a processor, a call connection request signal from a caller party terminal, the call connection request including outgoing call channel information indicating a medium through which the caller party terminal obtained the call connection request signal; extracting, by a processor, the outgoing call channel information from the received call connection request signal; and transmitting, by the processor, the outgoing call channel information to a called party terminal such that the outgoing call channel information is displayed on a display screen of the called party terminal.

At least one example embodiment provides that the call connection request signal further includes a phone number of the caller party terminal, and the outgoing call channel information is transmitted to the called party terminal such that the call channel information is displayed with the phone number of the caller party terminal on the display screen of the called party terminal.

At least one example embodiment provides that the outgoing call channel information indicates that the call connection request signal is generated by at least one of (i) dialing the phone number of the called party terminal, (ii) selecting the phone number of the called party from a contact list of the caller party terminal, (iii) obtaining the phone number of the called party terminal via a link selected from a webpage, (iv) obtaining the phone number of the called party from an advertising medium, (v) obtaining the phone number of the called party from a database, (vi) and obtaining the phone number of the called party via a scan of a quick response (QR) code.

At least one example embodiment provides that the outgoing call channel information includes information indicating the source from which the caller party terminal obtained the phone number of the called party terminal, the phone number of the called party terminal being a target of the call connection request signal transmitted from the caller party terminal.

BRIEF DESCRIPTION OF THE DRAWINGS

These and/or other aspects will become apparent and more readily appreciated from the following description of the embodiments, taken in conjunction with the accompanying drawings in which:

FIG. 2 is a detailed block diagram of an outgoing call channel information providing server and a service connection server of the outgoing call information providing system of FIG. 1;

FIGS. 5A and 5B are diagrams illustrating a method of displaying an outgoing call channel according to an example embodiment;

FIGS. 6A and 6B are diagrams illustrating a method of displaying an outgoing call channel according to an example embodiment; and FIGS. 7A and 7B are diagrams illustrating a method of displaying an outgoing call channel according to an example embodiment.

DETAILED DESCRIPTION

Figure 1:
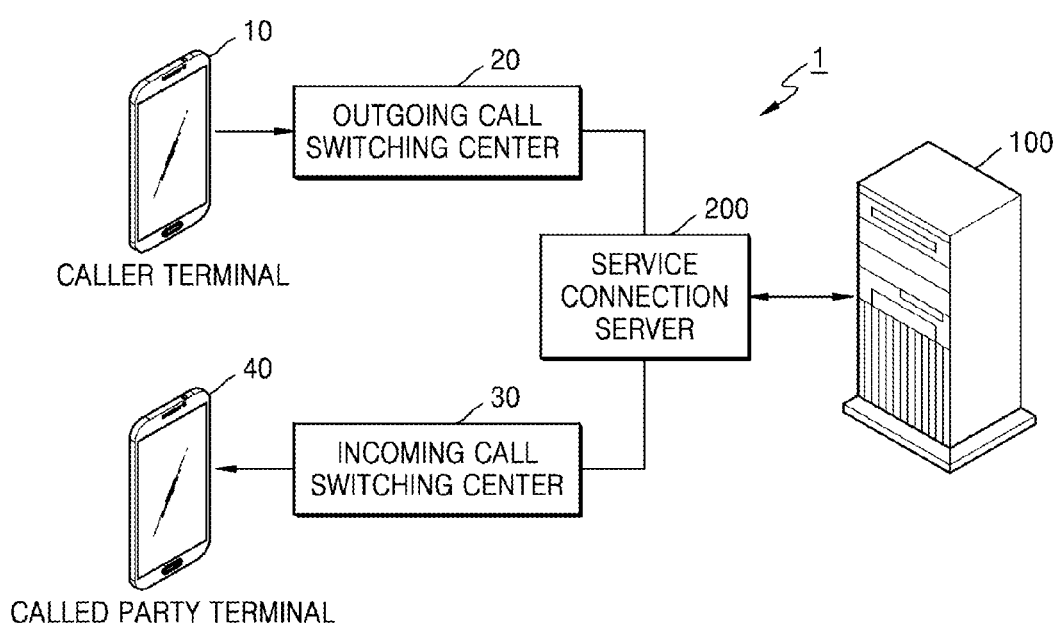
FIG. 1 is a diagram schematically illustrating the structure of an outgoing call information providing system according to an example embodiment.

Reference will now be made in detail to embodiments, examples of which are illustrated in the accompanying drawings, wherein like reference numerals refer to like elements throughout. Various example embodiments set forth herein should be understood that they are different from one another but are not mutually exclusive. For example, the features, shapes, and structures of elements described in the present embodiments are variable departing from the spirit and scope of the inventive concept. Also, the locations and arrangement of elements described in the present embodiments are variable without departing from the spirit and scope of the inventive concept. The present embodiments should be considered in descriptive detect only and not for purposes of limitation. Therefore, the scope of the inventive concept is defined not by the detailed description but by the appended claims, and all differences within the scope will be construed as being included in the inventive concept. As used herein, the term "and/or" includes any and all combinations of one or more of the associated listed items. Expressions such as "at least one of," when preceding a list of elements, modify the entire list of elements and do not modify the individual elements of the list.

Hereinafter, various example embodiments will be described in detail with reference to the accompanying drawings so that those of ordinary skill in the art that can easily accomplish the inventive concept.

FIG. 1 is a diagram schematically illustrating the structure of an outgoing call information providing system 1 according to an example embodiment.

Referring to FIG. 1, the outgoing call channel information providing system 1 according to an example embodiment includes a caller party terminal 10, an outgoing call switching center 20, an incoming call switching center 30, a called party terminal 40, an outgoing call channel providing server 100, and a service connection server 200.

In general, communication networks may be largely classified into cable networks and mobile networks. The cable networks should be understood as networks via which a subscriber's terminal and a communication network are connected via a cable so that the subscriber may make a call at predetermined locations, such as a public switched telephone network (PSTN) or an integrated services digital network (ISDN). The mobile networks should be understood as mobile communication networks that are serviced according to, for example, advanced mobile phone systems (AMPS), time division multiple access (TDMA), code division multiple access (CDMA), and/or any other like wireless communications standard. Since a subscriber's terminal and a communication network are connected in a wireless manner via the mobile networks, the subscriber can make a call regardless of a location and/or position of the caller party terminal. Example embodiments are applicable to both the cable networks and the mobile networks.

Subscribers who are provided with a service via a communication network may be largely classified into calling subscribers and called subscribers. The calling subscribers (callers) should be understood as persons who make a call, and the called subscribers (called parties) should be understood as persons who answer a call. A calling subscriber and a called subscriber may be located within the same communication network or different communication networks. Example embodiments are applicable to both a case in which a calling subscriber uses a cable network and a mobile network and a case in which a called subscriber uses a cable network and a mobile network.

Referring back to FIG. 1, the caller party terminal 10 and the called party terminal 40 should be understood as terminals that may exchange voice and data with each other or with other computing devices. According to various embodiments, caller party terminal 10 is physical hardware device capable of running one or more applications. Caller party terminal 10 may include a transmitter/receiver (or alternatively, a transceiver), memory, one or more processors, and/or other like components. Caller party terminal 10 may be configured to send/receive data to/from the outgoing call channel providing server 100 via the outgoing call switching center 20 and the incoming call switching center 30. Caller party terminal 10 may be designed to sequentially and automatically carry out a sequence of arithmetic or logical operations; equipped to record/store digital data on a machine readable medium; and transmit and receive digital data via a communications network. As noted previously, caller party terminal 10 may be configured to run, execute, or otherwise operate one or more applications. The applications may include native applications, web applications, and hybrid applications. Caller party terminal 10 may include wireless phones or smartphones, tablet personal computers (PCs), wearable computing devices, desktop PCs, laptop PCs, and/or any other physical or logical device capable of recording, storing, and/or transferring digital data via a network (e.g., communication network 400). It should also be noted that the called party terminal 40 may have a same or similar configuration as the caller party terminal 10. Additionally, the caller party terminal 10 and the called party terminal 40 include a display screen on which information may be displayed in a wire/wireless manner.

Caller party terminal 10 and called party terminal 40 may include one or more memory devices. The one or more memory devices are a hardware devices configured to store an operating system (OS) and program code for one or more software components. The one or more memory devices may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into the one or more memory devices using a drive mechanism (not shown). Such separate computer readable storage medium may include a Blue-ray, DVD/CD-ROM disc drive, memory card, memory stick, removable flash drive, sim card, and/or other like computer readable storage medium (not shown). In some embodiments, software components may be loaded into the one or more memory devices via network interface, rather than via a computer readable storage medium.

Caller party terminal 10 and called party terminal 40 may include one or more processors. The one or more processors may be configured to carry out instructions of a computer program by performing the basic arithmetical, logical, and input/output operations of the system. The one or more processors may include a single-core processor, a dual-core processor, a triple-core processor, a quad-core processor, one or more digital signal processors (DSPs), applicationspecific-integrated-circuits, field programmable gate arrays (FPGAs) and/or the like. The one or more processors may perform a variety of functions for the caller party terminal 10 and/or called party terminal 40 and may process data by executing program code, one or more software modules, firmware, middleware, microcode, hardware description languages, and/or any other like set of instructions stored in the one or more memory devices. The program code may be provided to the one or more processors by the one or more memory devices, one or more drive mechanisms (not shown), and/or via a network. In order to perform the variety of functions and data processing operations according to the example embodiments delineated herein, the program code and/or software components are loaded into the one or more processors. Once the program code is loaded into the one or more processors, the one or more processors may be programmed to perform the various operations and functions delineated by the program code, thereby transforming the one or more processors into a special purpose processor.

Caller party terminal 10 and called party terminal 40 may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of caller party terminal 10 and/or called party terminal 40, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of the caller party terminal 10 and/or called party terminal 40. The caller party terminal 10 and/or called party terminal 40 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. Caller party terminal 10 and/or called party terminal may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

The outgoing switching center 20, the incoming call switching center 30, and/or the service connection server 200 may be core network elements defined by a wireless communications network standard. Accordingly, the outgoing switching center 20, the incoming call switching center 30, and/or the service connection server 200 may include one or more hardware devices that provide various telecommunications services to mobile devices (e.g., caller party terminal 10 and/or called party terminal 40), which are connected to the core network via an access network element (e.g., a base station, a radio network controller, a radio access network device, and the like). For example, the outgoing switching center 20, the incoming call switching center 30, and/or the service connection server 200 may be one or more network elements or devices defined by the 3rd Generation Partnership Project (3GPP) standard, the European Telecommunications Standards Institute (ETSI) standard, and/or any other like telecommunications standards. Because the components of core network elements (e.g., the outgoing switching center 20, the incoming call switching center 30, and/or the service connection server 200) and their functionality are generally well-known, a further detailed description of the core network elements is omitted. It should be noted that the aforementioned functions may be provided by the same physical hardware device or by separate components and/or devices.

The outgoing call switching center 20 and the incoming call switching center 30 set up calls for voice, handle data communications. Signals transmitted/received to/from the caller party terminal 10 and/or transmitted/received to/from the called party terminal 40, and process voice and data exchanges between the caller party terminal 10 and the called party terminal 40.

As noted previously, a base station (not shown) and a base station controller (not shown) may be installed between the caller party terminal 10 (or the called party terminal 40) and the outgoing call switching center 20 (or the incoming call switching center 30). In this case, the outgoing call switching center 20 (or the incoming call switching center 40) may be a mobile communication switching center (not shown). Here, the base station (BS) (also referred to as a base transceiver system (BTS), a NodeB, or an evolved NodeB (eNodeB)) is a system that is connected wirelessly to a mobile communication terminal to control an incoming/outgoing mobile phone call and that connects a communication channel. The base station controller (BSC) (also referred to as a radio network controller (RNC), a radio access network (RAN) device, a radio access technology (RAT), and the like) is a controller that manages a plurality of base stations and operates while being interlinked with a mobile switching center (MSC) and/or a mobile switching center server (MSCS). The MSC may handle a voice call incoming/outgoing from/to the BSC, set up a call, operate and maintain the system, store billing records, access databases of one or more core network elements (e.g., a home location register (HLR) storing information regarding a mobile phone terminal and a visitor location register (VLR), etc.).

The outgoing call channel information providing server 100 and the service connection server 200 are network elements that may include one or more systems and/or applications for providing one or more services to client devices (e.g., caller party terminal 10 and called party terminal 40). Outgoing call channel information providing server 100 and service connection server 200 may include one or more processors, memory or computer readable storage medium, and a network interface. In some embodiments, outgoing call channel information providing server 100 and service connection server 200 may include a transmitter/receiver connected to one or more antennas. The outgoing call channel information providing server 100 and service connection server 200 may be any network element capable of receiving and responding to requests from one or more client devices (e.g., caller party terminal 10 and/or called party terminal 40) across a computer network (e.g., communication network 400) to provide one or more services. Accordingly, outgoing call channel information providing server 100 and service connection server 200 may be configured to communicate with the caller party terminal 10 and/or called party terminal 40 via a wireless protocol. Additionally, Outgoing call channel information providing server 100 and/or service connection server 200 may be a single physical hardware device, or outgoing call channel information providing server 100 and/or service connection server 200 may be physically or logically connected with other network devices, such that the outgoing call channel information providing server 100 and/or service connection server 200 may reside on one or more physical hardware devices. Outgoing call channel information providing server 100 and service connection server 200 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Outgoing call channel information providing server 100 and service connection server 200 may be configured to establish, manage, and terminate communications sessions, for example between the outgoing call channel information providing server 100 and caller party terminal 10/called party terminal 40, between service connection server 200 and caller party terminal 10/called party terminal 40, and/or between outgoing call channel information providing server 100 and service connection server 200. Outgoing call channel information providing server 100 and service connection server 200 may also be configured to establish, manage, and terminate communications sessions with two or more client devices. According to various embodiments, the caller party terminal 10 and/or called party terminal 40, the service connection server 200, and the outgoing call channel information providing server 100 may communicate with each other via a communications network 400 as described above.

As discussed above, outgoing call channel information providing server 100 and service connection server 200 may include one or more processors (not shown) and one or more data storage devices (not shown). The one or more processors may be special purpose computer processing devices configured to carry out program code stored in the one or more storage devices by performing arithmetical, logical, and input/output operations. For example, program code, software units, and/or software modules may be loaded into the one or more processors. Once the program code and/or software modules are loaded into the one or more processors, the one or more processors may be configured to perform operations according to various example embodiments.

The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules for performing operations according to various example embodiments. These software components may also be loaded from a separate computer readable storage medium into the one or more storage devices and/or the one or more processors using a drive mechanism (not shown). Such separate computer readable storage medium may include a floppy drive, disc, tape, Blu-ray/DVD/CD-ROM drive, memory card, removable flash memory drive, and/or other like computer readable storage medium (not shown). In some embodiments, software components may be loaded into the one or more storage devices and/or the one or more processors from a remote data storage device via a network interface, rather than via a computer readable storage medium.

Outgoing call channel information providing server 100 and service connection server 200 may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of outgoing call channel information providing server 100 and service connection server 200, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of outgoing call channel information providing server 100 and service connection server 200. Outgoing call channel information providing server 100 and service connection server 200 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. Outgoing call channel information providing server 100 and service connection server 200 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

According to various embodiments, the outgoing call channel information providing server 100 and the service connection server 200 may be connected to one or more local and/or remote databases (see e.g., DB 150, source code DB 151, outgoing call channel DB 152, caller DB 153, and called party DB 154 of the outgoing call channel information providing server 100 as shown in FIG. 2). In various embodiments, the one or more databases may include a database management system ("DBMS"), a relational database management system ("RDBMS") database, an object database ("ODBMS"), column-oriented DBMS, correlation database DBMS, and/or other like database management systems. In various embodiments, the one or more databases may be used by the outgoing call channel information providing server 100 and/or the service connection server 200 to store and record SNS-related content and/or advertising content.

Furthermore, in some embodiments, the outgoing call channel information providing server 100 and/or the service connection server 200 may include many more components than those discussed above, such as a display device, a network interface, and/or other like physical hardware components. However, it is not necessary that all of these generally conventional components be disclosed in order to disclose the example embodiments.

The outgoing call channel information providing server 100 displays an outgoing call channel on the called party terminal 40 by extracting outgoing call information, which is included in a call connection request signal transmitted from the caller party terminal 10 through the outgoing call switching center 20, and transmitting the outgoing call information to the called party terminal 40.

According to an example embodiment, an outgoing call channel should be understood as a source denoting a channel through which a calling number is input to the caller party terminal 10. For example, the outgoing call channel is 'direct dial input' when a caller himself/herself tries to a make a call by pressing a dial of the caller party terminal 10 directly. When quick-response (QR) code or other like matrix barcode is accessed by the caller party terminal 10 to try to connect a call, an outgoing call channel is 'OR code recognition'. The outgoing call information providing system 1 according to an example embodiment provides a system capable of displaying an outgoing call channel as described above on the called party terminal 40. The outgoing call channel information providing server 100 of the outgoing call information providing system 1 will be described in detail with reference to FIG. 2. It should be noted that the term "channel" as used herein may refer to any transmission medium or pathway, either tangible or intangible, through which data is communicated.

The service connection server 200 determines whether the phone number of the caller party terminal 10 included in a call connection request signal transmitted from the caller party terminal 10 is the phone number of a member of the outgoing call information providing system 1 through the outgoing call switching center 20. The service connection server 200 transmits outgoing call channel information and caller information obtained from the outgoing call channel information providing server 100 to the called party terminal 40. The service connection server 200 will be described in detail with reference to FIG. 2.

Although the outgoing call channel information providing server 100 and the service connection server 200 are illustrated as separate servers in the drawings, example embodiments are not limited thereto. That is, both components and/or devices that parse source code and generate the outgoing call channel information, and components and/or devices that act as a service connection server may be included in a single hardware computing device. That is, the outgoing call channel information providing server 100 and the service connection server 200 need not reside one separate physical hardware devices.

FIG. 2 is a detailed block diagram of the outgoing call channel information providing server 100 and the service connection server 200 of the outgoing call information providing system 1 of FIG. 1.

Referring to FIG. 2, the outgoing call channel information providing server 100 according to an example embodiment may include a controller 110, a source code generator 121, a source code extractor 122, an outgoing call channel generator 123, an outgoing call channel transmission unit 124, an authorized source determination unit 125, an application providing unit 126, and a database (DB) 150. The service connection server 200 may include a service providing determination unit 210 and a caller information providing unit 220.

According to an example embodiment, the outgoing call information providing system 1 generates source code; provides the source code to the caller party terminal 10 of FIG. 1; generates outgoing call channel information by extracting source code included in a call connection request signal transmitted from the caller party terminal 10; and transmits the outgoing call channel information to the called party terminal 40 of FIG. 1 so as to display this information on a display screen of the called party terminal 40.

A service for providing the phone number of a caller to a terminal of a called party has been generally provided. That is, a caller identification service has been provided to provide the phone number of a caller to a display screen of a terminal of a called party and to additionally display the name of the caller on the display screen when the phone number of the caller is registered to the contact list stored in the terminal of the called party so that the called party may identify the caller. However, in various embodiments a called party may wish to obtain meaningful information other than (or in addition to) the phone number of a caller when the phone number of the caller is not registered to the called party's contact list.

As the numbers of spam calls and advertising calls have increased, mobile device users have become reluctant to answer incoming calls from unknown phone numbers, since the phone numbers thereof are not registered to the called party's contact lists. However, many users may desire a way to determine whether to answer an incoming call or not by determining whether the incoming call is an advertising call based on the area code or the format of a calling number of the incoming call.

Because advertisers promote their merchandise and phone numbers through various advertising media, it is impossible for the advertisers to find out an advertising media through which new clients used to find them, which is one reason why the efficiencies of advertising media is difficult to be verified. For example, when an advertiser has exposed his/her phone number to signs, name cards, search advertisement, a homepage, and/or other like advertising media, the advertiser may have a difficult time determining an advertising medium through which a new client used to call the advertiser unless the advertiser explicitly asks the new client from where the new client learned of the advertiser's products and/or services. Therefore, many advertisers have difficulties determining an advertising medium on which the advertiser has to focus.

According to an example embodiment, in order to provide meaningful information to both a caller and a called party, the outgoing call information providing system 1 may provide the called party terminal 40 with outgoing call channel information representing the way and/or means through which the caller party terminal 10 obtained the called party's phone number or other like contact information. Thus, the called party is provided with both the calling number and outgoing call channel information of a call incoming to the called party terminal 40. According to various embodiments, when the called party is an advertiser, the called party is able to notice a channel through which a new client contacted the called party. When the called party is not an advertisers (or alternatively "a general user"), the called party is able to determine whether the call incoming to the called party terminal 40 is a spam call or an informative call or another like desired call. Also, since the calling party (or alternatively, the "caller party") is able to display his/her outgoing call channel on the called party terminal 40, a probability that the called party will answer the call from the calling party may be increased even when the caller's phone number is not stored in a contact list of the called party terminal 40.

Referring back to FIG. 2, the service connection server 200 includes the service providing determination unit 210 and the caller information providing unit 220.

The service providing determination unit 210 may determine whether the phone number of the caller party terminal 10 included in a call connection request signal transmitted from the caller party terminal 10 is a phone number of a member of the outgoing call information providing system 1 according to an example embodiment. When it is determined that the phone number of the caller party terminal 10 is not a phone number of a member of the outgoing call information providing system 1, the call connection request signal is transmitted to the incoming call switching center 30. When it is determined that the phone number of the caller party terminal 10 is a phone number of a member of the outgoing call information providing system 1, the call connection request signal is transmitted to the outgoing call channel providing server 100. In this case, the service connection server 200 may include a local or remote database and use or otherwise access data stored in the DB 150 of the outgoing call channel information providing server 100 and transmit or otherwise provide the accessed data to the service providing determination unit 210. Using the data, the service providing determination unit 210 may determine whether the phone number of a caller is a phone number of a member of the outgoing call information providing system 1.

The outgoing call channel information providing server 100 includes the controller 110, the source code generator 121, the source code extractor 122, the outgoing call channel generator 123, the outgoing call channel transmission unit 124, the authorized source determination unit 125, and the application providing unit 126. The DB 150 includes a source code database (DB) 151, an outgoing call channel database (DB) 152, a caller database (DB) 153, and a called party database (DB) 154. The DBs 151 to 154 may manage source code, an outgoing call channel, caller information, and called party information that are managed by the outgoing call channel providing server 100, respectively.

The controller 110 may comprise one or more processors configured to carry out and/or execute program code by performing arithmetical, logical, and input/output operations. In various embodiments, controller 110 may coordinate or otherwise provide data to/from the various databases (e.g., the DBs 151 to 154) from/to the various modules (e.g., the source code generator 121, the source code extractor 122, the outgoing call channel generator 123, the outgoing call channel transmission unit 124, the authorized source determination unit 125, and the application providing unit 126) of the outgoing call channel providing server.

The source code generator 121 generates at least one source code corresponding to an outgoing call channel. The outgoing call channel represents a channel through which a phone number that is a target of a call connection request signal is obtained as described previously. For example, when a calling party and/or caller party tries to connect a call by choosing a phone number from a mobile homepage, an outgoing call channel may be "the mobile homepage" or another like indicator when displayed on a display screen on a called party terminal 40. When a caller tries to connect a call by choosing a phone number from a contact list, an outgoing call channel may be "the contact list' or another like indicator when displayed on a display screen on a called party terminal 40. In addition, various other types of outgoing call channels and call channel indicators may be present. The reason why the outgoing call channel has been described here in the point of view of the called party is that outgoing call channel information is displayed on a display screen of the called party terminal 40, as will be described in detail.

The source code is information coded to match each outgoing call channel. For example, the source code may be '0001' when the outgoing call channel is a mobile homepage and may be '0002' when the outgoing call channel is a contact list. It should be noted that in various embodiments, any sequence of characters may be used as the source code to match an outgoing channel. For example, the source code may be any sequence of digits and/or characters that define an advertising medium associated with the outgoing call channel. In addition, the source code may also defining or otherwise include a position and/or location of the mobile terminal, user identification and/or demographic information associated with the mobile terminal, and/or other like pieces of information. In embodiments where the source code uses digits (e.g., '0001' when the outgoing call channel is a mobile homepage), each digit may represent a different piece of information. In other embodiments, the each piece of information may be a string of characters separated by a period, comma, semicolon, colon, hyphen, and/or any other like character that may be used to separate pieces of information.

The source code generator 121 may generate at least one source code corresponding to the outgoing call channel, provide the at least one source code to the caller party terminal 10, and store the at least one source code in the database 150. The at least one source code provided to the caller party terminal 10 may match the outgoing call channel to display the outgoing call channel when the caller party terminal 10 generates a call connection request signal. Continuing with the previous example, when a user selects to make a call by choosing a phone number at a mobile homepage or other like webpage, the caller party terminal 10 (i.e., the terminal being used by the calling party/caller party) that receives source code from the source code generator 121 may generate a call connection request signal, which includes the source code '001', and transmit the call connection request signal to the outgoing call switching center 20.

The call connection request signal should be understood as a signal that a caller transmits to the outgoing call switching center 20 to request communication to be established with a called party. In the related art, a call connection request signal contains a called party's phone number and a caller's phone number. Thus, in conventional systems the called party terminal 40 is only provided with information regarding the caller that includes the caller's phone number. However, the outgoing call channel information providing server 100 according to various example embodiments inserts or otherwise includes source code, which includes other pieces of information alternatively or in addition to a calling party's phone number, into a call connection request signal to display outgoing call channel information. In various embodiments, the source code may be encoded, encapsulated, or otherwise included in one or more data packets of a data stream or signal associated with the outgoing call, such as the call connection request signal.

The source code extractor 122 may receive the call connection request signal from the outgoing call switching center 20 and extract the source code from the call connection request signal. In various embodiments, the source code extractor 122 may extract the source code from one or more data packets of the call connection request signal. The source code extractor 122 determines whether source code is included in the call connection request signal, based on the source code generated by the source code generator 121. If it is determined that source code is not included, the source code extractor 122 informs the service connection server 200 of this fact and controls the service connection server 200 to directly transmit the call connection request signal to the incoming call switching center 30.

The outgoing call channel generator 123 may parse the extracted source code and generate outgoing call channel information. As described above, source code(s) generated by the source code generator 121 are transmitted to the caller party terminal 10. The caller party terminal 10 includes a source code corresponding to a calling action into a call connection request signal and/or one or more data packets of the call connection request signal. When a call is connected, the outgoing call channel generator 123 may parse the source code extracted by the source code extractor 122 and generate the outgoing call channel information from the parsed source code. The parsing of the source code may include any method of analyzing symbols, characters, digits, and the like according to rule of a natural language and/or computer language. Once the source code is parsed, one or more portions of the source code may be used to determine the outgoing call channel information to be included in a call connection request signal.

In various embodiments, the outgoing call channel generator 123 may generate the outgoing call channel information by translating, transforming, or otherwise converting the extracted source code into text data, audio data, image data, video data, and/or any other like display data that may indicate a source and/or medium from which an incoming call originates. The converting of the extracted source code into display data may be carried out according to known methods.

When source code '001' is included in a call connection request signal, the outgoing call channel generator 123 may generate outgoing call channel information to represent an incoming call from a mobile homepage. In such embodiments, the outgoing call channel information may be represented by text data, audio data, image data, video data, and/or any other like display data associated with the mobile homepage. In various embodiments, the display data associated with the mobile homepage may be extracted from the mobile homepage by the outgoing call channel information providing server 100. In some embodiments, the display data associated with the mobile homepage may be provided to the outgoing call channel information providing server 100 by an operator of the mobile homepage and/or another like entity that maintains and/or hosts the mobile homepage.

That is, the outgoing call channel generator 123 receives source code(s) transmitted from the source code generator 121 to the caller party terminal 10 and obtains outgoing call channel information by parsing the source code(s).

In the above example embodiment, a case in which the outgoing call channel information providing server 100 extracts and parses source code from a call connection request signal transmitted from the caller party terminal 10 to detect an outgoing call channel. According to another example embodiment, the outgoing call channel information providing server 100 may exchange outgoing call channel information with terminals rather than source code. That is, in various embodiments the caller party terminal 10 may include outgoing call channel information representing an incoming call from a mobile homepage into a call connection request signal rather than source code. In such embodiments, the outgoing call channel generator 123 may extract outgoing call channel information from the call connection request signal. In such embodiments, the source code generator 121 need not generate source code and provide it to the caller party terminal 10. Instead, according to various embodiments, the caller party terminal 10 may generate a call connection request signal to include outgoing call channel information thereof. In such embodiments, the outgoing call channel generator 123 may directly extract the outgoing call channel information from the call connection request signal without parsing source code.

According to an example embodiment, the outgoing call channel transmission unit 124 transmits outgoing call channel information to the called party terminal 40. The outgoing call channel transmission unit 124 may transmit outgoing call channel information generated by the outgoing call channel generator 123 to the incoming call switching center 30 directly or via the service connection server 200. The outgoing call channel transmission unit 124 may enable a user to display the parsed outgoing call channel information on the display screen of the called party terminal 40.

By way of example, if source code extracted by the source code extractor 122 is '001' when a call connection request signal is transmitted from the caller party terminal 10, the outgoing call channel generator 123 generates outgoing call channel information to represent an incoming call from a mobile homepage. The outgoing call channel transmission unit 124 transmits the outgoing call channel information to the service connection server 200, and the service connection server 200 transmits the outgoing call channel information to the called party terminal 40. The called party terminal 40 that receives the outgoing call channel information may display the outgoing call channel information on the display screen thereof.

Figure 3A:
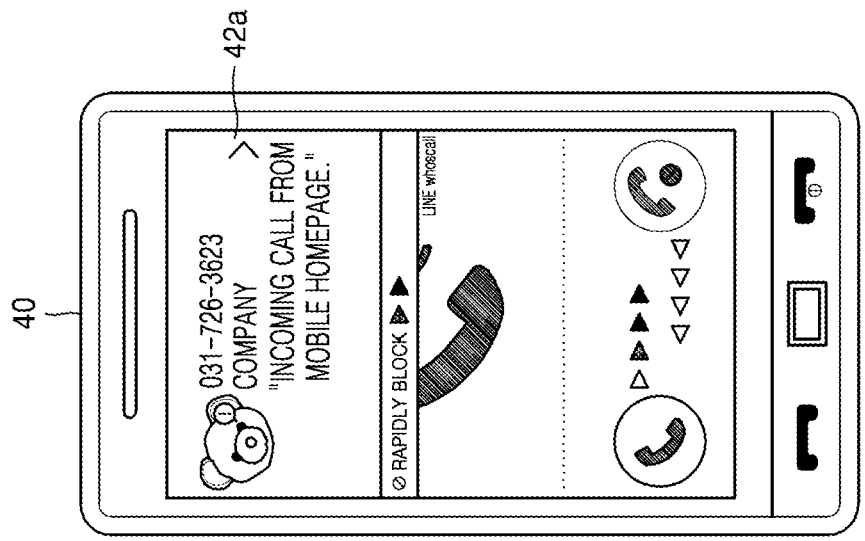
FIGS. 3A and 3B illustrate examples of an incoming call screen displayed on a called party terminal according to an example embodiment.
Figure 3B:
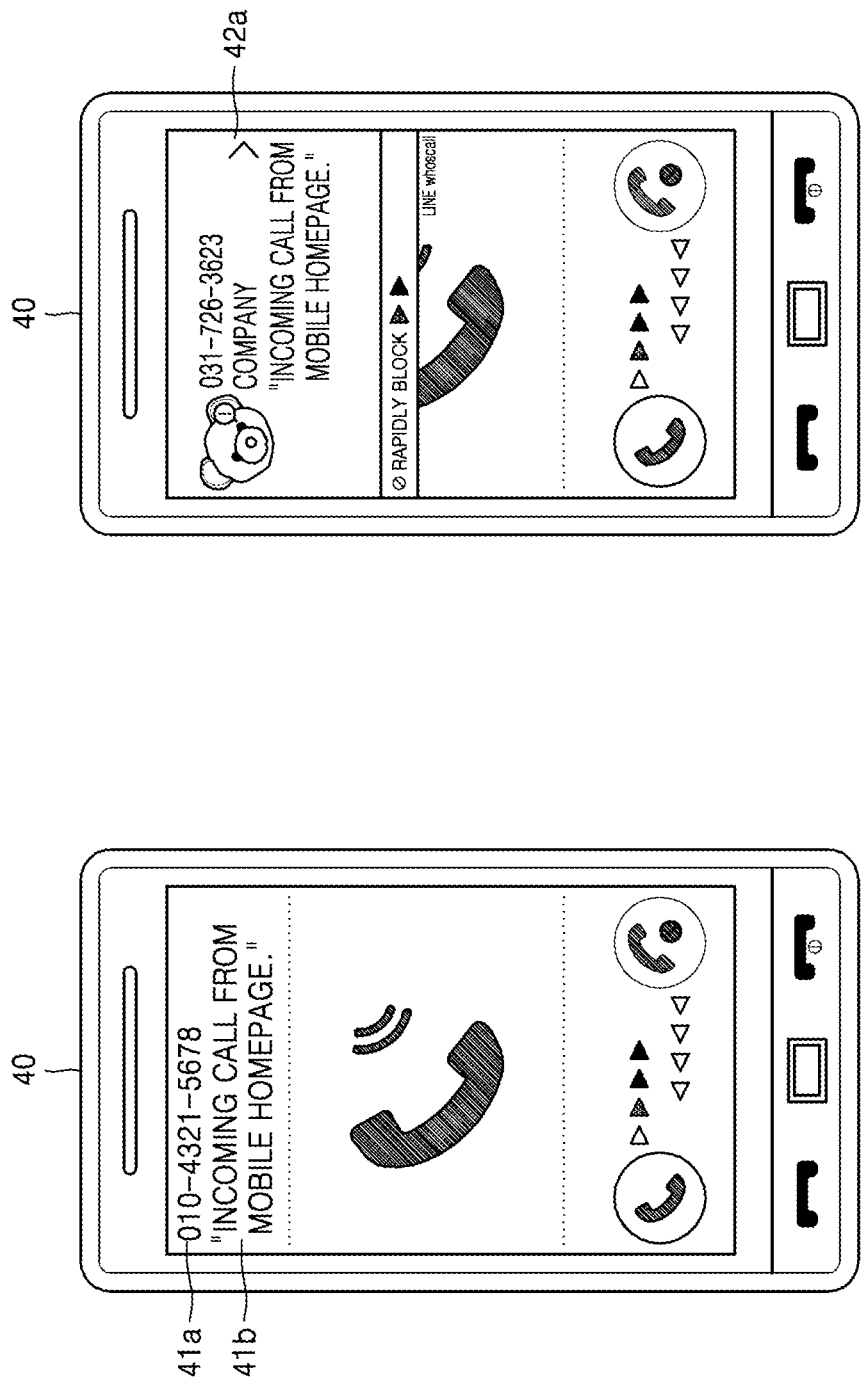

FIGS. 3A and 3B illustrate examples of an incoming call screen displayed on a called party terminal according to various example embodiments.

FIG. 3A illustrates an incoming call screen displayed on a called party terminal 40. In the incoming call screen of FIG. 3A, a caller phone number 41*a* and an outgoing call channel 41*b* are displayed. Thus, a called party may recognize an outgoing call channel through which a caller corresponding to the caller phone number 41*a* had obtained the called party's phone number by checking the incoming call screen. Thus, the called party may obtain information regarding an advertising medium or other like source through which the caller accessed the called party's phone number.

FIG. 3B illustrates a case in which an application provided from the application providing unit 126 (which will be described below) of the outgoing call channel information providing server 100 is installed in a called party terminal 40 according to another example embodiment. Referring to FIG. 3B, an application screen 42a may be displayed to overlap an incoming call screen displayed on the called party terminal 40. As illustrated in FIG. 3B, a caller's phone number, the name of the caller obtained through an application, and call source information may be displayed together in the application screen 42a. Referring to FIG. 3B, the caller's phone number may be '031-726-3623', the name of the caller obtained through the application may be 'company', and the call source information may be "an incoming call from a mobile homepage". However, the application illustrated in FIG. 3B is designed to identify a caller's phone number that is not registered to a contact list of a called party, but is instead registered in a cloud address book or other like directory. The purpose of the inventive concepts may be achieved without using an application as illustrated in FIG. 3A.

That is, FIG. 3A illustrates a case in which an application is not installed in the called party terminal 40 and the outgoing call channel information provided from the outgoing call channel information providing server 100 is directly displayed in a "default" incoming call screen. FIG. 3B illustrates a case in which an application is installed in the called party terminal 40 and both the name of a caller detected based on the caller's phone number through the application and outgoing call channel information provided from the outgoing call channel information providing server 100 are displayed. Example embodiments may be selectively applied to the embodiments shown by FIGS. 3A-B.

Referring back to FIG. 2, the authorized source determination unit 125 determines whether source code included in a call connection request signal transmitted from the caller party terminal 10 is authorized source code. In various embodiments, the caller party terminal 10 is provided with source code(s) generated by the source code generator 121 and transmits a source code matching an outgoing call channel when a call connection request signal is transmitted. However, there is a possibility that a source code has been modified to conceal an outgoing call channel. Accordingly, in various embodiments, the authorized source determination unit 125 determines whether the source code has been modified, and blocks the call connection request signal when he authorized source determination unit 125 determines that the source code is not an authorized source code.

For example, when a caller is a spam advertiser, an outgoing call channel may have been illegally obtained from an Internet phone number database, but a source code included in a call connection request signal may be changed into a source code corresponding to a phone number registered to a contact list so as to conceal a true source of the calling party (i.e., information associated with the spam advertiser). In these instances, the authorized source determination unit 125 may determine whether the source code is an authorized source code by comparing the source code generated by the source code generator 121 or a source code otherwise allocated to the caller party terminal 10 with the source code in the current call connection request signal. If the source code allocated to the caller party terminal 10 is substantially different than the source code contained within the current call connection request signal, the authorized source determination unit 125 may determine that the source code within the current call connection request signal has been maliciously modified. If the authorized source determination unit 125 determines that the source code within the current call connection request signal has been maliciously modified, the authorized source determination unit 125 may block the call connection request signal when. In some embodiments, if the authorized source determination unit 125 determines that the source code within the current call connection request signal has been maliciously modified, the authorized source determination unit 125 may alter the source code within the current call connection request signal so as to display a true source of the current call connection request signal.

The application providing unit 126 may generate an application for performing functions of the components of the outgoing call channel information providing server 100 and the service connection server 200 according to the example embodiments disclosed herein, and provide the application to the caller party terminal 10 and/or the called party terminal 40.

The application providing unit 126 may provide the called party terminal 40 with an application for a called party through an application store, which may be accessed by the called party terminal 40. The application for a called party may be an application for representing an outgoing call channel. For example, the application for a called party may be embodied as illustrated in FIG. 2 or embodied as one or more components of the application described above with reference to FIG. 2.

Also, the application providing unit 126 may provide the caller party terminal 10 with an application for a caller through the application store. The caller party terminal 10 in which the application for a caller is installed may obtain source code(s) from the source code generator 121, include a source code corresponding to an outgoing call channel into a call connection request signal and transmit the call connection request signal to the outgoing call switching center 20 when a phone number is dialed.

According to various example embodiments, the application providing unit 126 provides an application to the caller party terminal 10. However, according to other example embodiments, a function of the outgoing call information providing system 1 may be provided in a default application even when an additional application is not installed in the caller party terminal 10. For example, when a caller chooses and dials a phone number based on a selected portion of a webpage displayed in an Internet browser application installed as a default application in the caller party terminal 10, the Internet browser application may generate a source code representing the phone number selected at a mobile web page as an outgoing call channel, and transmit the source code to the outgoing call switching center 20.

Figure 4A:
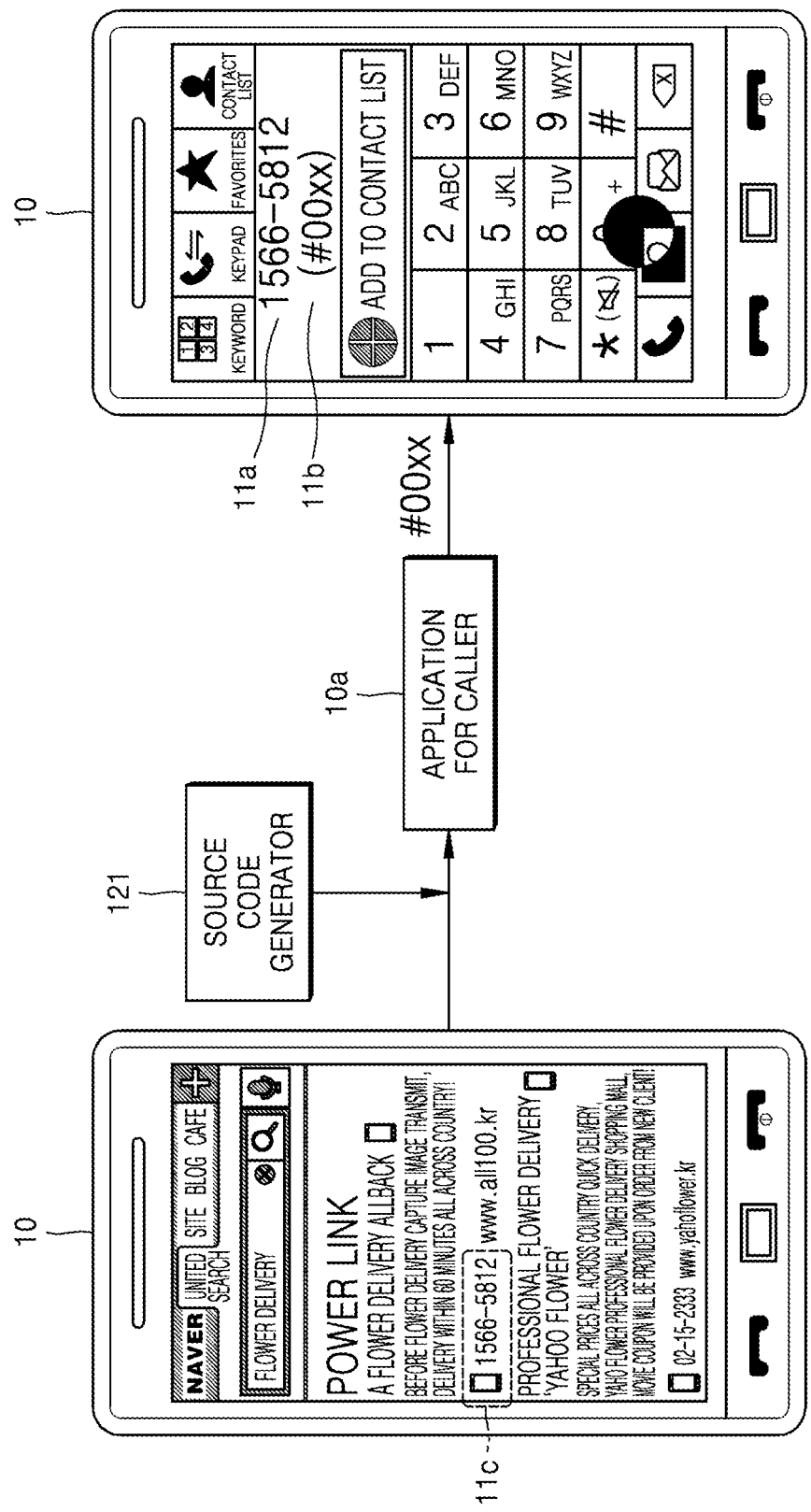
FIGS. 4A and 4B are diagrams illustrating a method of displaying an outgoing call channel according to an example embodiment.
Figure 4B:
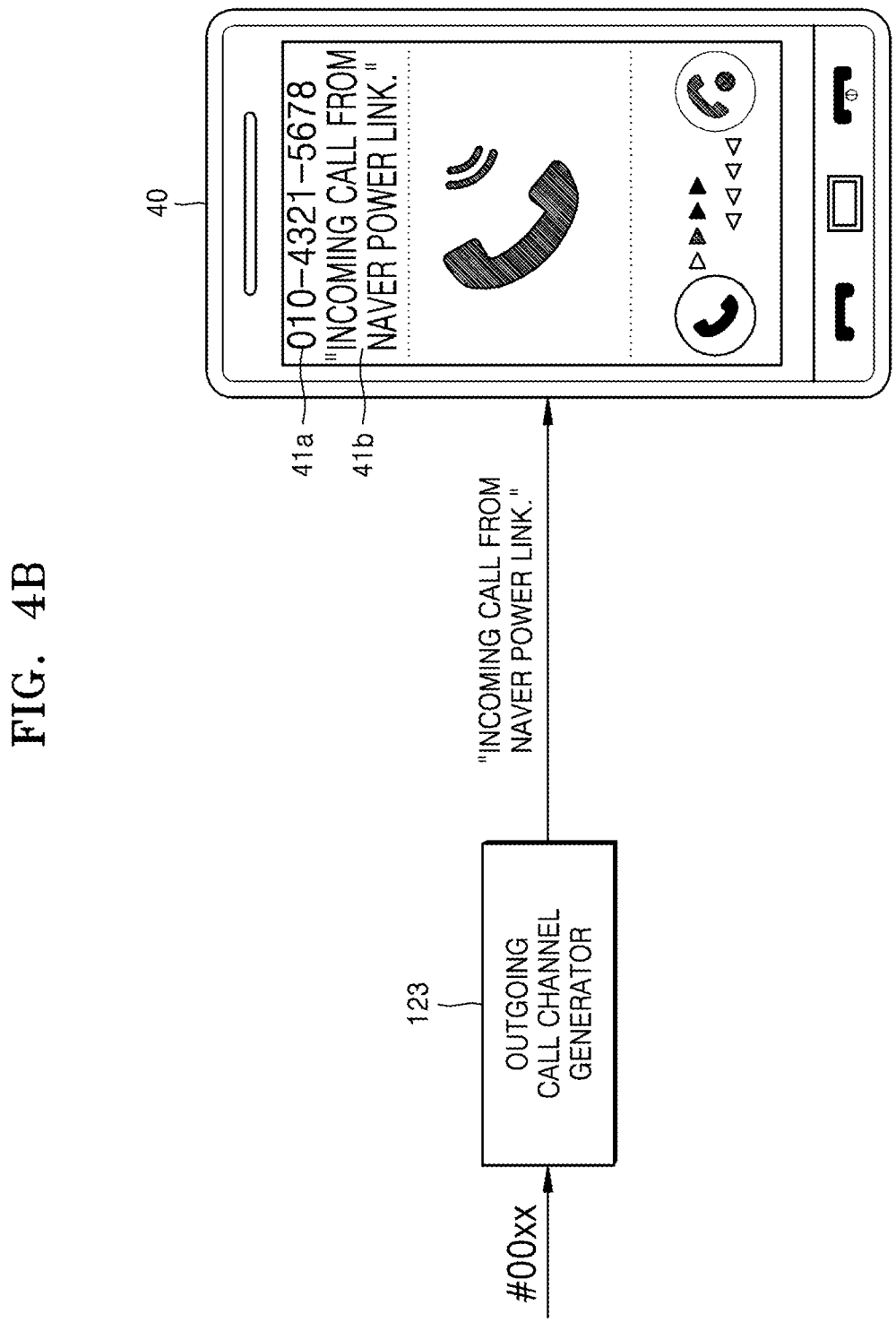

FIGS. 4A and 4B are diagrams illustrating a method of displaying an outgoing call channel according to an example embodiment.

Referring to FIG. 4A, when a caller executes a calling function by choosing or otherwise selecting an advertisement link 11c in a search screen displayed on a caller party terminal 10, an application 10a for a caller, which is installed in a caller's terminal, detects the execution of the calling function and determines a source code corresponding to an outgoing call channel. In various embodiments, the advertisement link 11c may be selected by way of a touch gesture on a touchscreen display device of the caller party terminal 10, a mouse click when the caller party terminal 10 is a desktop PC or a laptop PC, a voice command, and/or any other like method of selecting a hyperlink. For example, as shown in FIG. 4A a source code corresponding to an outgoing call channel associated with an advertising source "Naver power link" is '#00xx'. According to various embodiments, when the advertisement link 11c is selected by a user of the caller party terminal 10, a calling function may be initiated or otherwise executed for calling a party associated with the advertisement link 11c (e.g., "1566-5812" as shown). As shown, when a user of selects the advertisement link 11c, the source code generator adds the source code "#00xx" and the caller application 10a provides the source code "#00xx" with a phone number "1566-5812" associated with the advertisement link 11c. When the calling function is executed, the caller application 10a includes or otherwise inserts a called party's phone number 11a and the source code 11b '#00xx' into a call connection request signal. The caller application 10a (or alternatively "application for a caller 10a" as shown) may refer to an application installed on a caller party terminal 10, which receives source code data from the source code generator 121 of the outgoing call channel information providing server 100 when a source code is determined or otherwise obtained from an advertising medium.

FIG. 4B illustrates a display screen of the called party terminal 40 when a call is made using the caller party terminal 10 as shown in FIG. 4A. As illustrated in FIG. 4B, a source code '#00xx' is changed into outgoing call channel information 'an incoming call from Naver power link' by the outgoing call channel generator 123. The outgoing call channel information is based on the source code "#00xx" inserted into the call connection request signal by the source code generator 121 as shown in FIG. 4A. The extracted outgoing call channel information is displayed as an outgoing call channel 41b on the display screen of the called party terminal 40 together with the caller's phone number 41a. For convenience of explanation, the functions of the source code extractor 122, the outgoing call channel transmission unit 124, the authorized source determination unit 125, etc. are not illustrated in FIGS. 4A and 4B.

According to an example embodiment, a called party application 40a (or alternatively an "application for a called party 40a" as shown) is installed in the called party terminal 40 by the application providing unit 126. The called party application 40a may determine whether a source code is included in a call connection request signal and generate outgoing call channel information whenever a call receiving function is executed by the called party terminal 40. In such embodiments, the called party application 40a may display calling information on a display screen thereof such that the source code included in the call connection request signal matches outgoing call channel information corresponding to the source code. Otherwise, some functions of the called party application 40a may also be included in another application. For example, since an application corresponding to the application screen 42a of FIG. 3B is designed to block spam calls, an outgoing call channel may be displayed to provide more helpful information. In this case, the called party application 40a according to an example embodiment may perform functions of the existing applications.

FIGS. 5A and 5B are diagrams illustrating a method of displaying an outgoing call channel according to an example embodiment.

Referring to FIG. 5A, when a caller executes a calling function by choosing a phone number link 11d at a mobile web page screen displayed on a caller party terminal 10, a caller application 10a installed in the caller party terminal 10 detects the execution of the calling function and determines a source code corresponding to an outgoing call channel. For example, as shown in FIG. 5A, when a source code corresponding to the phone number link 11d selected at the mobile web page screen as an outgoing call channel is '#1234', the caller application 10a includes the source code 11b '#1234'. The source code 11b '#1234' is inserted into a call connection request signal by the source code generator 121, and is displayed together with a called party's phone number 11a when the calling function is executed.

FIG. 5B illustrates a display screen of the called party terminal 40 when a call is made using a caller party terminal 10 as illustrated in FIG. 5A. As illustrated in FIG. 5B, a source code '#1234' may be changed into outgoing call channel information "an incoming call from a mobile homepage (ID plastic surgery)" by the outgoing call channel generator 123, and displayed as outgoing call channel information 41b on a screen of the called party terminal 40 together with a caller's phone number 41a.

FIGS. 6A and 6B are diagrams illustrating a method of displaying an outgoing call channel according to another example embodiment.

Referring to FIG. 6A, a caller executes a calling function by scanning or otherwise obtaining a QR code 11e displayed on an advertising leaflet. The user of the caller party terminal 10 may use an image sensor included in the caller party terminal 10 to scan or otherwise image the QR code 11e. The recognized QR code 11e is then displayed on a display device of the caller party terminal 10, when a caller application 10a installed in the caller party terminal 10 detects the execution of the calling function by way of scanning the QR code 11e. The caller application 10a obtains or otherwise determines a source code 11a corresponding to an outgoing call channel based on the QR code 11e. For example, when the QR code 11e is scanned, the caller application 10a may obtain a source code "#0101" from the source code generator 121 based on information encoded in the QR code 11e. When the source code 11a corresponding to the outgoing call channel is determined to be '#0101' by the source code generator 121, the caller application 10a inserts or otherwise includes the source code 11b '#0101' into a call connection request signal together with a called party's phone number 11a when the calling function is executed by the caller party terminal 10. In various embodiments, since desired (or alternatively "predetermined") information may be obtained by simply scanning the QR code 11e, information obtained from the QR code 11e may be included in the source code 11b and/or the call connection request signal. For example, outgoing call channel information corresponding to the source code 11b '#0101' may represent or otherwise display "an incoming call from a QR code included in a promotional leaflet of an 'x' district" based on information encoded in the QR code 11e. The caller application 10a may also refer to the source code received from the source code generator 121 of the outgoing call channel information providing server 100 when obtaining additional information to insert into the call connection request signal.

In some embodiments, the caller party terminal 10 may include an application that recognizes an object in an image obtained by an image sensor of the caller party terminal 10. The recognized object may be used to obtain a source code from the source code generator 121 in the same or similar fashion as discussed previously with regard to the QR code 11e. For example, a user of the caller party terminal 10 may capture an image of a pamphlet that does not include a QR code 11e, and an image recognition application may recognize information contained in the capture image, and obtain a source code from the source code generator 121 even though the pamphlet does not include a QR code 11e.

FIG. 6B illustrates a display screen of the called party terminal 40 when a call is made using the caller party terminal 10 as illustrated in FIG. 5A. As illustrated in FIG. 5B, the source code 11b '#0101' may be changed into outgoing call channel information "a call incoming from a QR code included in a promotional leaflet of an 'x' district" by the outgoing call channel generator 123, and displayed as outgoing call channel information 41*b* on the display screen of the called party terminal 40 together with the caller's phone number 41*a*.

Figure 7B:
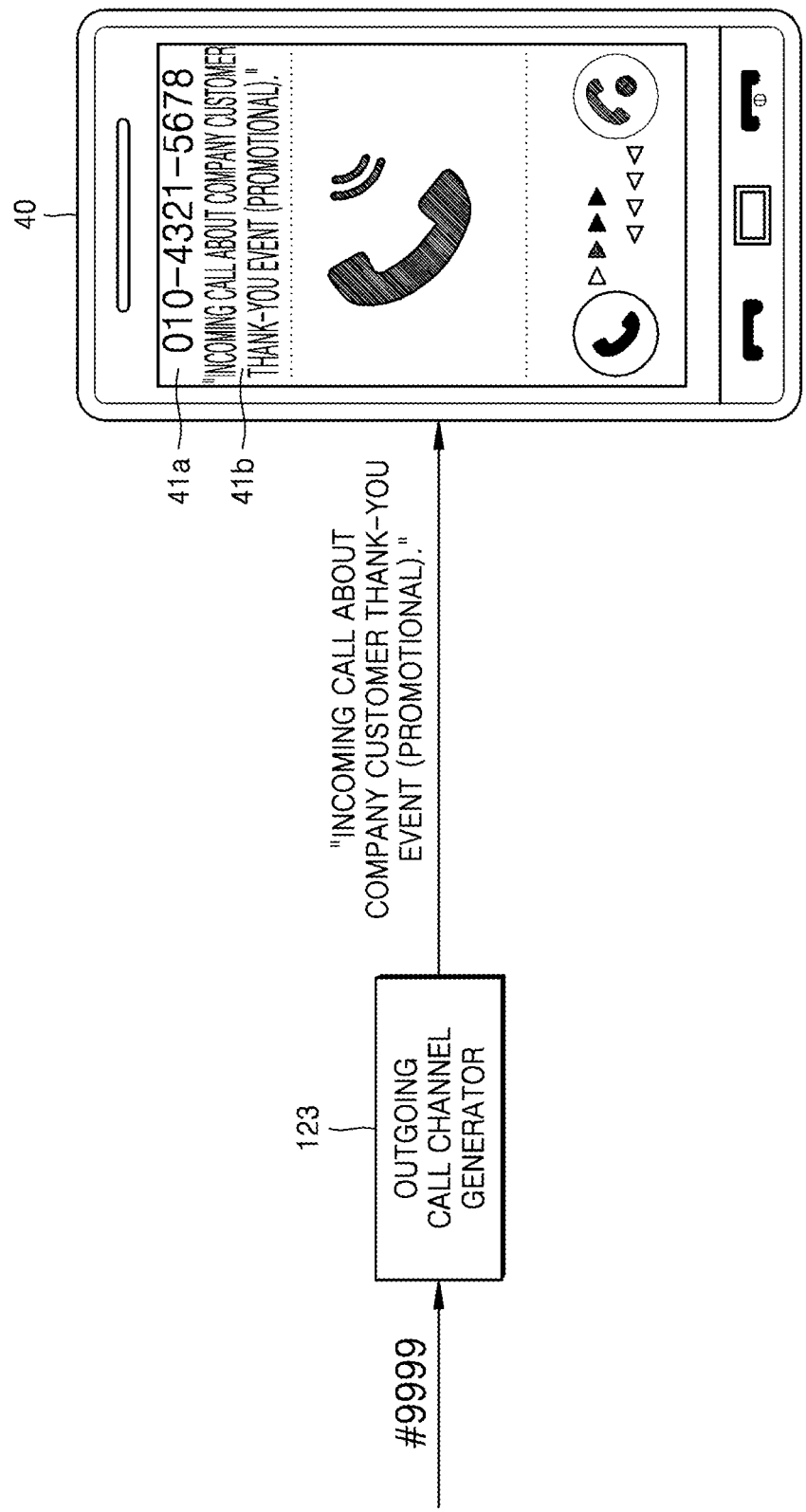

FIGS. 7A and 7B are diagrams illustrating a method of displaying an outgoing call channel according to another example embodiment.

FIGS. 7A and 7B illustrate a source code and outgoing call channel information corresponding to the source code that match the features of a database when an outgoing call channel source is the database. In the case of a business that provides services to clients by telemarketing, even calls that may be desired by a called party may likely be misunderstood as spam calls by the called party, thereby preventing desired information from being delivered to the called party. Accordingly, various example embodiments of the outgoing call information providing system 1 allows both marketers and consumers to be able to effectively access desired information while decreasing unnecessary energy and resource consumption.

Referring to FIG. 7A, a telemarketing or other like promotion-based caller makes a call by obtaining a called party's phone number from a database or other like directory of phone numbers. The telemarketing caller may end up having a source code indicating 'an incoming call based on a database' input as outgoing call channel information, such that a called party may consider the call as a spam call and be reluctant to answer the call. Thus, according to various example embodiments, the telemarketing caller may assign a unique source code to each of a plurality of databases and register different outgoing call channel information items to be associated with a corresponding source code.

For example, as illustrated in FIG. 7A, when the phone numbers of clients who register their phone numbers in a first database in order to receive customer thank-you events are selected by a telemarketing caller, a source code may be generated and outgoing call channel information corresponding to the source code may be prepared to display "A company customer thank-you event (promotional) call". Then, a called party may determine whether to answer the call or not based on an outgoing call channel even when a caller corresponding to a calling number is unknown.

As another example, when the phone numbers of clients who register their phone numbers in a second database regarding clients who request counseling is stored selected by a telemarketing caller, a source code is assigned to the second database, and outgoing call channel information may be prepared to display "a call about the request for consultation from C company".

By way of another example, when the phone numbers of clients who register their phone numbers in a third database in order to receive notices from a company regarding the client's service agreement with the company is selected by a telemarketing caller, a source code is assigned to the third database, and outgoing call channel information may be prepared to display "notice of expired contract with B company (informative)".

As described above, according to the one or more of the above example embodiments, helpful and/or desired information may be reliably provided to a called party by providing, to the called party, information regarding a channel through which a caller obtained a called party's phone number.

Also, according to the one or more of the above example embodiments, information regarding an advertising medium through which consumers tried to make a call to an advertiser is provided to the advertiser so as to help the advertiser evaluate an effectiveness of an advertising medium.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

The example embodiments set forth herein are merely examples and are not intended to limit the scope of the inventive concept. For clarity, other functional aspects of the existing electronic structures, control systems, software, and systems may not be described herein. Also, lines or connecting members that connect components illustrated in the drawings are merely used to represent functional connection and/or physical or circuit connections, and may be thus replaced with other elements or used to represent additional various other functional connections, physical connection, or circuit connections when the inventive concept is applied to an actual apparatus. Also, components illustrated in the drawings may be omitted unless they are particularly stated using expressions such as "necessary" or "important".

The singular forms such as "a", "an" and "the" used in the present specification (particularly, in the claims) are intended to include the plural forms as well, unless the context clearly indicates otherwise. If the term "range" is used in the present disclosure, the inventive concept should be understood as including embodiments to any individual values belonging to the "range" are applied unless mentioned otherwise. Lastly, operations included in a method according to an example embodiment may be performed in an appropriate order unless specified particularly or otherwise. Thus, the inventive concept is not limited by the order in which the operations are described. All examples or example terms (e.g., "etc.") used in the present disclosure are simply chosen to describe the inventive concept in detail. Thus, the scope of the inventive concept is not limited by the examples or the example terms unless they are defined in the claims appended herein. Also, it will understood by those of ordinary skill in the art that the inventive concept can be derived according to design conditions and factors that are within the range of the claims covering various changes, combinations, and modifications, or an equivalent thereof.

It should be understood that the example embodiments described therein should be considered in a descriptive detect only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of the inventive concepts as defined by the following claims.

What is claimed is:

1. An outgoing call information providing device comprising:
   a non-transitory computer-readable medium configured to store program code; and
   at least one processor configured to execute the program code to,
      receive a call connection request signal from a caller party terminal, the call connection request includes (i) a phone number of a called party terminal and (ii) a source code indicating a source from which the caller party terminal obtained the phone number of the called party terminal,
      extract the source code from the call connection request signal,
      parse the extracted source code,
      generate outgoing call channel information based on the parsed source code, the outgoing call channel information indicating the source, and
      transmit the call connection request signal according to the phone number of the called party terminal such that the called party terminal receives the generated outgoing call channel information with a phone number of the caller party terminal.

2. The device of claim 1, wherein the at least one processor is further configured to:
   generate the source code when the phone number of the called party terminal is obtained by the caller party terminal, and
   provide the source code to the caller party terminal when a calling function is activated by the caller party terminal, the calling function being activated when the phone number of the called party terminal is obtained by the caller party terminal, the calling function being used to generate the call connection request.

3. The device of claim 2, wherein the at least one processor is further configured to:
   determine whether the extracted source code is an authorized source code after the call connection request is received by determining whether source code previously allocated to the caller terminal is substantially similar to the source code in the call connection request signal.

4. The device of claim 1, wherein the outgoing call channel information includes information indicating the source from which the caller party terminal obtained the phone number of the called party terminal, the phone number of the called party terminal being a target of the call connection request signal transmitted from the caller party terminal.

5. The device of claim 1, wherein the outgoing call channel information indicates that the call connection request signal is generated by at least one of:
   (i) dialing the phone number of the called party terminal;
   (ii) selecting the phone number of the called party from a contact list of the caller party terminal;
   (iii) obtaining the phone number of the called party terminal is via a link from a webpage;
   (iv) obtaining the phone number of the called party from an advertising medium;
   (v) obtaining the phone number of the called party from a database; and
   (vi) obtaining the phone number of the called party being via a scan of a quick response (QR) code.

6. The device of claim 1, wherein the at least one processor is further configured to:
   generate a caller party application to be provided to the caller party terminal, the caller party application inserting the generated outgoing call channel information into the call connection request signal, and
   generate a called party application to be provided to the called terminal, the called party application transforming the outgoing call channel information into display data, the display data being displayed by the called party terminal when the called party receives the call connection request signal.

7. The device of claim 6, wherein the caller party application detects the outgoing call channel, matches the outgoing call channel with the source code when a calling function is activated in the caller party terminal, and inserts the matching source code into the call connection request signal when the call connection request signal is generated.

8. The device of claim 6, wherein the display data includes at least one of text data, audio data, image data, and video data.

9. The device of claim 6, wherein the at least one processor is further configured to the program:
   provide the caller party application to the caller party terminal, and
   provide the called party application to the called party terminal.

10. The device of claim 8, wherein the display data is one of (i) provided to the outgoing call information providing device by the caller party terminal and (ii) extracted from a webpage associated with the caller party terminal.

11. A method of providing outgoing call channel information, the method comprising:
   receiving, by at least one processor, a call connection request signal from a caller party terminal, the call connection request including (i) a phone number of a called party terminal and (ii) a source code indicating a source from which the caller party terminal obtained the phone number of the called party terminal;

extracting, by the at least one processor, the source code from the call connection request signal;

generating, by the at least one processor, outgoing call channel information by parsing the source code, the outgoing call channel information being based on at least one portion of the parsed source code, the outgoing call channel information indicating the source; and transmitting, by the at least one processor, the call connection request signal according to the phone number of the called party terminal such that the called party terminal receives the generated outgoing call channel information with a phone number of the caller party terminal.

12. The method of claim 11, wherein the source code is generated when the phone number of the called party terminal is obtained by the caller party terminal; and the generated source code is provided to the caller party terminal when a calling function is activated by the caller party terminal, the calling function being activated when the phone number of the called party terminal is obtained by the caller party terminal, the calling function being used to generate the call connection request.

13. The method of claim 12, further comprising:

determining, using the at least one processor, whether the extracted source code is an authorized source code, after the call connection request is received, by determining whether source code previously allocated to the caller terminal is substantially similar to the source code in the call connection request signal.

14. The method of claim 11, wherein the outgoing call channel information includes information indicating the source from which the caller party terminal obtained the phone number of the called party terminal, the phone number of the called party terminal being a target of the call connection request signal transmitted from the caller party terminal.

15. The method of claim 11, wherein the outgoing call channel information indicates that the call connection request signal is generated by at least one of:

(i) dialing the phone number of the called party terminal;
(ii) selecting the phone number of the called party being from a contact list of the caller party terminal;
(iii) obtaining the phone number of the called party terminal via a link of a webpage;
(iv) obtaining the phone number of the called party terminal from an advertising medium;
(v) obtaining the phone number of the called party terminal from a database; and
(vi) obtaining the phone number of the called party via a scan of a quick response (QR) code.

16. The method of claim 11, further comprising:

displaying, using the at least one processor, the outgoing call channel information on a screen of the called party terminal.

17. A method of providing outgoing call channel information, the method comprising:

receiving, by at least one processor, a call connection request signal from a caller party terminal, the call connection request including a phone number of the called party terminal and outgoing call channel information indicating a medium through which the caller party terminal obtained contact information of the called party;

extracting, by the at least one processor, the outgoing call channel information from the received call connection request signal; and transmitting, by the at least one processor, the outgoing call channel information to a called party terminal such that the outgoing call channel information according to the phone number of the called party is displayed on a display screen of the called party terminal.

18. The method of claim 17, wherein the call connection request signal further includes the phone number of the caller party terminal.

19. The method of claim 17, wherein the outgoing call channel information indicates that the call connection request signal is generated by at least one of:

(i) dialing the phone number of the called party terminal;
(ii) selecting the phone number of the called party from a contact list of the caller party terminal;
(iii) obtaining the phone number of the called party terminal via a link selected from a webpage;
(iv) obtaining the phone number of the called party from an advertising medium;
(v) obtaining the phone number of the called party from a database; and
(vi) obtaining the phone number of the called party via a scan of a quick response (QR) code.

20. The method of claim 17, wherein the outgoing call channel information includes information indicating the source from which the caller party terminal obtained the phone number of the called party terminal, the phone number of the called party terminal being a target of the call connection request signal transmitted from the caller party terminal.

* * * * *